United States Patent
Nair et al.

(10) Patent No.: US 11,188,303 B2
(45) Date of Patent: Nov. 30, 2021

(54) FLOATING POINT MULTIPLY HARDWARE USING DECOMPOSED COMPONENT NUMBERS

(71) Applicant: Facebook, Inc., Menlo Park, CA (US)

(72) Inventors: Krishnakumar Narayanan Nair, Newark, CA (US); Anup Ramesh Kadkol, Sunnyvale, CA (US); Ehsan Khish Ardestani Zadeh, San Jose, CA (US); Olivia Wu, Los Altos, CA (US); Yuchen Hao, Fremont, CA (US); Thomas Mark Ulrich, Mountain View, CA (US); Rakesh Komuravelli, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 136 days.

(21) Appl. No.: 16/591,042

(22) Filed: Oct. 2, 2019

(65) Prior Publication Data

US 2021/0103429 A1 Apr. 8, 2021

(51) Int. Cl.
*G06F 7/487* (2006.01)
*G06F 7/485* (2006.01)
*G06F 17/16* (2006.01)
*G06N 3/02* (2006.01)

(52) U.S. Cl.
CPC .......... *G06F 7/4876* (2013.01); *G06F 7/485* (2013.01); *G06F 17/16* (2013.01); *G06N 3/02* (2013.01)

(58) Field of Classification Search
CPC .. G06F 7/485; G06F 17/01216; G06F 7/4876; G06N 3/02

USPC ......................................................... 708/495
See application file for complete search history.

(56) References Cited

U.S. PATENT DOCUMENTS 8,001,360 B2 * 8/2011 Hansen ................ G06F 9/3861 712/30
8,195,735 B2 * 6/2012 Hansen .................. G06F 17/16 708/607
10,776,078 B1 * 9/2020 Clark ..................... G06F 7/4876
(Continued)

OTHER PUBLICATIONS

Cheng et al.: "Accelerating 2D FFT: Exploit GPU Tensor Cores through Mixed-Precision Extended Abstract", Nov. 1, 2018 (Nov. 1, 2018), XP055648195, Retrieved from the Internet: URL: https://sc18.supercomputing.org/proceedings/src_poster/poster_files/spost111s2-file2.pdf [retrieved on Dec. 2, 2019].
(Continued)

*Primary Examiner* — Tan V Mai
(74) *Attorney, Agent, or Firm* — Van Pelt, Yi & James LLP (57) ABSTRACT

A processor system comprises one or more logic units configured to receive a processor instruction identifying a first floating point number to be multiplied with a second floating point number. The floating point numbers are each decomposed into a group of a plurality of component numbers, wherein a number of bits used to represent each floating point number is greater than a number of bits used to represent any component number in each group of the plurality of component numbers. The component numbers of the first group are multiplied with the component numbers of the second group to determine intermediate multiplication results that are summed together to determine an effective result that represents a result of multiplying the first floating point number with the second floating point number.

20 Claims, 7 Drawing Sheets

(56) References Cited

U.S. PATENT DOCUMENTS

2019/0042244 A1    2/2019  Henry

OTHER PUBLICATIONS

Henry et al.: "Leveraging the bfloat16 Artificial Intelligence Datatype For Higher-Precision Computations", 2019 IEEE 26th Symposium on Computer Arithmetic (ARITH), IEEE, Jun. 10, 2019 (Jun. 10, 2019), pp. 69-76, XP033636222, DOI: 10.1109/ARITH.2019.00019 [retrieved on Oct. 18, 2019].

* cited by examiner

FLOATING POINT MULTIPLY HARDWARE USING DECOMPOSED COMPONENT NUMBERS

BACKGROUND OF THE INVENTION

A whole class of complex artificial intelligence problems can be solved using neural networks. One common operation required by many neural networks is a multiplication operation, for example, when performing matrix operations. Since artificial intelligence problems are often computationally and data intensive, hardware solutions are often beneficial for improving performance. However, the hardware to implement a floating-point multiplication operation is expensive. Moreover, different neural networks can require different number formats, which in turn can each have different hardware requirements. It is a technical challenge to create a hardware platform compatible with multiple number formats and capable of efficiently performing matrix multiplication operations. Therefore, there exists a need for a high throughput matrix multiplication scheme that is compatible with multiple number formats without introducing significant hardware complexity and expense.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A processor system for improving the efficiency and performance of floating point multiplication operations is disclosed. In some embodiments, multiplication support is implemented for a variety of formats including different floating point formats such as FP32, BFloat16, and FP16. The number of bits used to represent a supported floating point number may exceed the number of bits supported by the hardware capabilities of a multiplication unit. For example, a multiply unit may support 21-bit operands but utilizing the disclosed techniques, the processor system supports 32-bit floating point multiplication operations. In various embodiments, a processor instruction specifies a first and second floating point number as multiplication operands. In the event the floating point operands exceed the number of bits supported by the hardware capabilities of a multiplication unit, each floating point operand is decomposed into a group of component numbers. The component numbers are sized based on the capabilities of the multiplication units. For example, a processor system that includes FP21 multiplication units can utilize FP21 component numbers. A 32-bit floating point multiplication operation can not be performed by an FP21 multiplication unit using only a single multiplication operation. A 32-bit floating point can be decomposed into multiple FP21 numbers. Once decomposed, the different component numbers of the first and second floating point operands are multiplied to determine intermediate multiplication results. For example, the different component numbers of the first floating point number can be loaded into a vector operand. For each component number of the second floating point number, a corresponding vector operand with duplicates of the component number is loaded and a vector multiply operation is performed to determine a vector of intermediate multiplication results. The resulting intermediate multiplication results are summed to determine the effective result of multiplying the first and second floating point numbers. In some embodiments, a vector adder unit such as a vector adder tree can be used to sum the intermediate multiplication results.

In some embodiments, a processor system comprises one or more logic units and one or more multiplication units. For example, one or more logic units receive a processor instruction corresponding to a matrix multiplication operation and prepare operations and operands for one or more multiplication units to perform multiplication operations on the prepared operands. In some embodiments, the one or more logic units are configured to receive a processor instruction identifying a first floating point number to be multiplied with a second floating point number. For example, a floating point multiply instruction may specify two operands to be multiplied. The operands may be in one of many different formats, such as FP32, BFloat16, FP16, or another number format. The different number formats may require a different number of bits to represent a number. In the event the multiplication units do not natively support the floating point format, for example, the format exceeds the number of bits supported by the hardware capabilities of a multiplication unit component, the first floating point number is decomposed into a first group of a plurality of component numbers. In various embodiments, the number of bits used to represent the first floating point number is greater than the number of bits used to represent any component number in the first group of the plurality of component numbers. For example, an FP32 number expressed using 32-bits can be decomposed into two (or more) component numbers, where each component number uses fewer bits than an FP32 number. In some embodiments, the component numbers are 21-bit numbers, an FP21 number, and/or another appropriate number format. Similarly, the second floating point number is decomposed into a second group of a plurality of component numbers, wherein the number of bits used to represent the second floating point number is greater than the number of bits used to represent any component number in the second group of the plurality of component numbers. For example, a second floating point number that is an FP32 number and expressed using 32-bits can be decomposed into two (or more) component numbers, where each component number uses fewer bits than an FP32 number. Once decomposed, the groups of component numbers can be used as operands for one or more multiplication units. In some embodiments, the one or more multiplication units are configured to multiply the component numbers of the first group with the component numbers of the second group to determine intermediate multiplication results. The intermediate multiplication results are summed together to determine an effective result that represents a result of multiplying the first floating point number with the second floating point number. For example, each component of the first floating point number is multiplied against each component of the second floating point number to create a set of partial multiplication results using one or more vector multiply units of a matrix processor. The partial results can be summed together using one or more vector adder units of the matrix processor to determine the multiplication result of multiplying the first floating point number with the second floating point number. Although the first floating point number and the second floating point number use more bits than supported by any one of the multiplication units, the decomposed components are supported by the multiplication units and are used to determine the effective multiplication result. In some embodiments, the component numbers of the first and second floating point numbers allocate an additional bit for each of their respective exponents to avoid loss of accuracy, for example, due to a potential underflow when adding exponents. For example, an FP32 number using an 8-bit exponent can be decomposed into FP21 numbers using 9-bit exponents. In various embodiments, at least the partial results are calculated using component numbers with an additional exponent bit, such as with FP21 numbers using 9-bit exponents when multiplying two FP32 numbers having 8-bit exponents.

Figure 1:
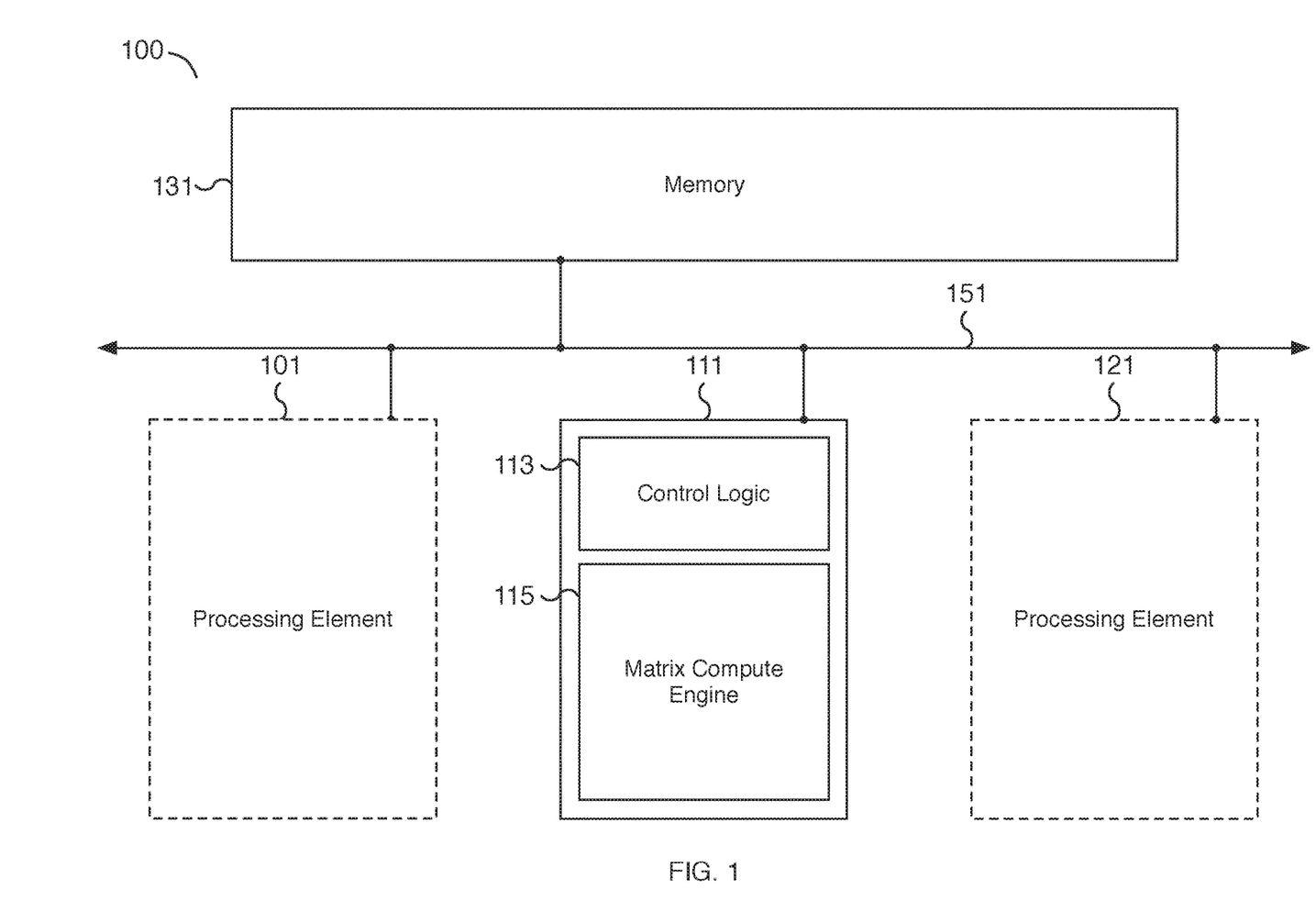
FIG. 1 is a block diagram illustrating an embodiment of a system for solving artificial intelligence problems using a neural network.

FIG. 1 is a block diagram illustrating an embodiment of a system for solving artificial intelligence problems using a neural network. For example, system 100 may be applied to use a neural network to solve problems such as image recognition and recommendation system matches. In the example shown, system 100 includes multiple processing elements such as processing elements 101, 111, and 121 connected to memory unit 131 via bus 151. In various embodiments, system 100 may include fewer or more processing elements. For example, the number of processing elements can be scaled up or down depending on the intended computational and data requirements. In some embodiments, the processing elements, such as 101, 111, and 121, are communicatively connected to one another and/or memory unit 131 via bus 151. For example, the memory unit may be a last level cache (LLC) and/or may be implemented using static random-access memory (SRAM). Each processing element may be utilized by system 100 to perform matrix compute operations such as matrix multiplications including floating point multiplications.

In some embodiments, a communication bus, such as bus 151, may be used to transmit processing element instructions and optional instruction arguments. For example, a matrix operation and matrix operands may be transmitted to a processing element, such as processing elements 101, 111, and/or 121, via bus 151. Additional processing element instructions may include multiplication operation instructions such as floating point multiplication operation instructions. In various embodiments, a large, complex artificial intelligence problem can be solved using system 100 by subdividing the problem into smaller sub-problems. The smaller sub-problems can be assigned and distributed to different processing elements. The results of the smaller sub-problems can be merged to determine the solution to the larger and more complex problem. In some scenarios, the sub-problems are solved in parallel and/or in pipelined stages. In some scenarios, the result from a first processing element is fed as an input to a second processing element.

In some embodiments, each processing element of system 100 includes at least a control logic unit and a matrix compute engine. As shown with respect to processing element 111, processing element 111 includes control logic 113 and matrix compute engine 115. Processing elements 101 and 121 are shown as dotted boxes and some details of processing elements 101 and 121 are not shown. In some embodiments, the control logic unit of a processing element is used to control the operation of the processing element including the operation of the processing element's matrix compute engine. In the example shown, control logic 113 processes instructions directed to processing element 111 via communication bus 151. For example, a processing element instruction may include a floating point multiplication instruction. In some embodiments, control logic 113 determines how to perform the floating point multiplication using matrix compute engine 115, including how to decompose floating point number operands into component numbers. In some embodiments, control logic 113 receives processing element instructions via bus 151 and can be used to initiate retrieving and/or writing data from/to memory 131.

In some embodiments, matrix compute engine 115 is a hardware matrix compute engine for performing matrix operations including operations related to floating point multiplication, matrix multiplication, and/or convolution operations. For example, matrix compute engine 115 may be a matrix engine for performing dot product operations requiring floating point multiplications and addition operations. In some embodiments, the convolution operations supported include depthwise, groupwise, normal, regular, pointwise, two-dimensional, and/or three-dimensional convolutions, among others. For example, matrix compute engine 115 may receive a first input matrix such as a subset of a large image and a second input matrix such as a filter, kernel, or convolution matrix, etc. to apply to the first input matrix. Matrix compute engine 115 can be used to perform a convolution operation using the two input matrices to determine a resulting output matrix. In some embodiments, matrix compute engine 115 may include input and/or output buffers for loading input data matrices or vectors and writing out a result data matrix or vector. In some embodiments, matrix compute engine 115 includes multiple vector units and each vector unit includes a vector multiply unit and a vector adder unit.

Figure 2:
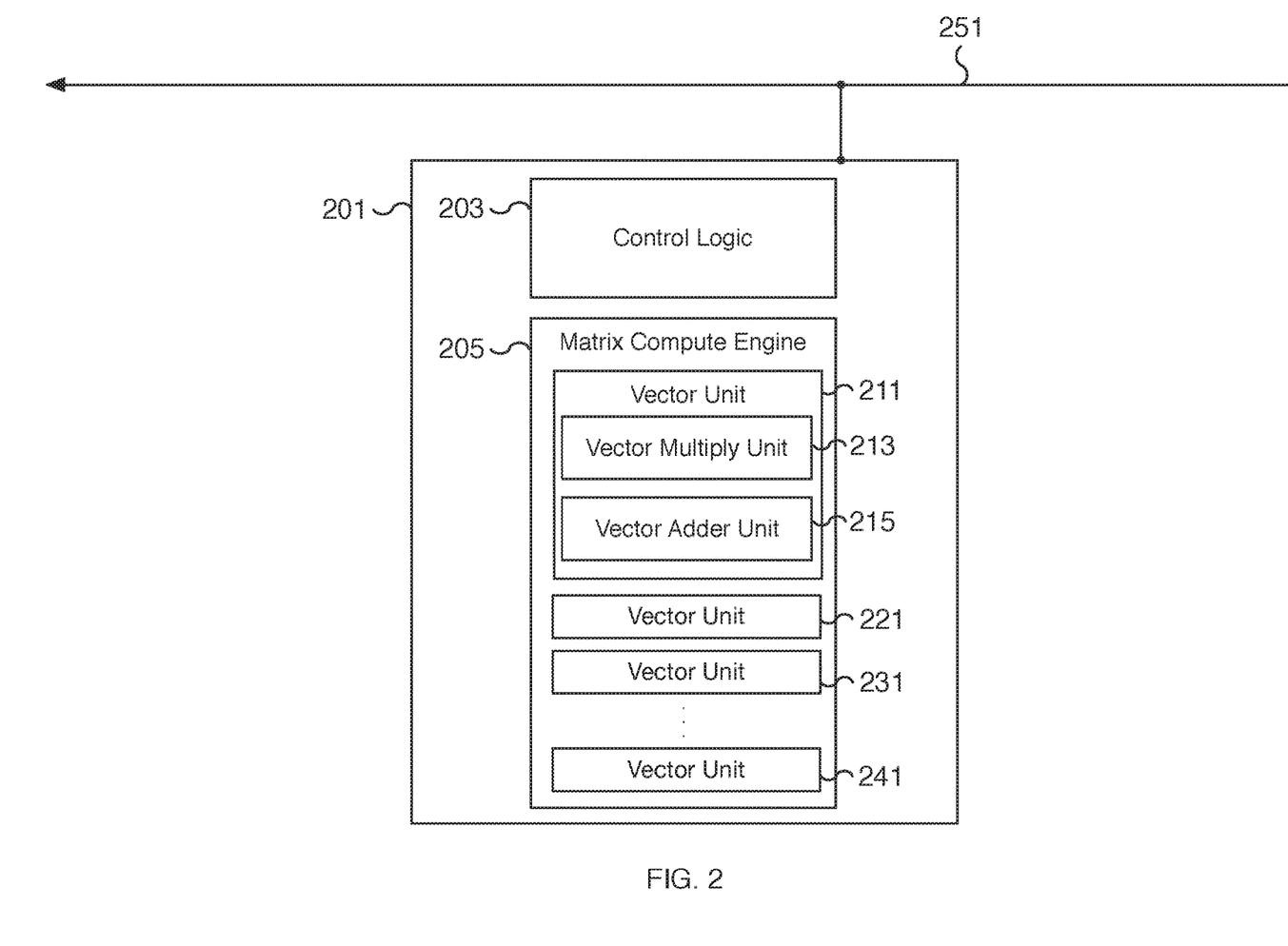
FIG. 2 is a block diagram illustrating an embodiment of a processing element for solving artificial intelligence problems using a neural network.

FIG. 2 is a block diagram illustrating an embodiment of a processing element for solving artificial intelligence problems using a neural network. In the example shown, processing element 201 is communicatively connected to bus 251. Processing element 201 includes control logic 203 and matrix compute engine 205. Matrix compute engine 205 includes vector units 211, 221, 231, and 241. In various embodiments, a matrix compute engine may include more or fewer vector units. For example, a matrix compute engine may include 32 vector units, each capable of processing two 32-element vectors. In some embodiments, each vector unit includes a vector multiply unit and a vector adder unit. In the example shown, vector unit 211 includes vector multiply unit 213 and vector adder unit 215. For simplicity, the vector multiply and vector adder units of vector units 221, 231, and 241 are not shown but function similar to vector multiply unit 213 and vector adder unit 215. In some embodiments, processing element 201 is processing element 101, 111, and/or 121 of FIG. 1. In some embodiments, control logic 203 and matrix compute engine 205 are, respectively, control logic 113 and matrix compute engine 115 of FIG. 1.

In some embodiments, matrix compute engine 205 receives input matrix (or vector) operands to perform matrix operations. For example, matrix compute engine 205 may receive one or more data input vectors corresponding to a portion of an image and at least one weight input vector corresponding to a filter matrix. The input vectors, such as input data and weight vectors, may be passed as arguments to a vector unit, such as one of vector units 211, 221, 231, and 241, of matrix compute engine 205. For example, the vector unit of matrix compute engine 205 may determine a matrix result, such as a dot product result, using a data input vector and weight input vector pair. In some embodiments, matrix compute engine 205 includes 32 vector units. Each vector unit may take two 32-element vectors as arguments and can each determine a 32-element vector result. In some embodiments, the result is a single element result and taken across all vector units of matrix compute engine 205, the results are an output vector result. In various embodiments, the output results are determined by accumulating partial vector results across multiple vector unit operations. For example, a multiplication operation can be decomposed into multiple multiplication operations and the results summed. In various embodiments, the number of vector units of matrix compute engine 205 can vary as can the vector unit lengths and element sizes. For example, elements may be 4-bits, 8-bits, 2-byte, 4-bytes, or another appropriate size. Depending on the capabilities of the vector unit, different element sizes can be natively supported without decomposing the element into components.

In some embodiments, each vector unit of matrix compute engine 205, such as vector units 211, 221, 231, or 241, receives two vector operands and can perform one or more vector operations. For example, a vector unit can compute the result of multiple multiply operations by multiplying each element of the first input vector with a corresponding element of a second input vector. The resulting multiplication results can be accumulated and used for future operations, such as summing partial results. For example, a vector unit result can be accumulated and used as an operand to a subsequent operation performed by the vector unit.

In some embodiments, each vector unit of matrix compute engine 205, such as vector units 211, 221, 231, or 241, includes both a multiply unit and an adder unit. Each vector multiply unit of a vector unit, such as vector multiply unit 213, is configured to multiply corresponding elements received via input vector operands. In some embodiments, the result is a vector of multiplication results. For example, for two 32-byte input vectors, the result of a vector multiply unit is a vector of 32 multiplication results. The first element from a first input vector is multiplied with the first element of a second input vector. Similarly, the second element from the first input vector is multiplied with the second element of the second input vector. In various embodiments, the largest supported element size may be a 21-bit number, such as a 21-bit floating point number, or another appropriate size. In various embodiments, the vector of multiplication results is passed to a vector adder unit of the vector unit. For example, vector multiply unit 213 can pass its multiplication results to vector adder unit 215. Vector adder unit 215 can be used for addition operations such as summing partial results, computing at least in part a dot product result, or other appropriate functionality.

In some embodiments, each vector adder unit of a vector unit, such as vector adder unit 215, is configured to compute addition operations using elements from an input vector. For example, the sum of selected elements from a vector of multiplication results computed by vector multiply unit 213 is computed by vector adder unit 215. In some embodiments, the result of a vector adder unit is a dot product of the vectors used as input to the corresponding vector multiply unit. In various embodiments, each vector adder unit, such as vector adder unit 215, is implemented as an adder tree. For example, the top level of an adder tree may add pairs of elements to determine a set of partial sums, such as adding elements 0 and 1 to determine a first partial sum and elements 2 and 3 to determine a second partial sum, etc. Each subsequent level may sum pairs of partial sums from the previous level until the last level computes a final result sum. In some embodiments, any partial sums may be outputted as a result of the adder unit. In various embodiments, each adder tree computes partial sums in parallel to arrive at a result sum. The parallel operation significantly improves the efficiency of summing a vector of numbers. In various embodiments, multiple vector units can operate in parallel to compute multiple results in parallel, significantly improving the throughput of matrix compute engine 205.

In some embodiments, matrix compute engine 205 includes one or more accumulators, for example, to accumulate the results of each vector unit. In some embodiments, an accumulator is included as part of a vector unit or as part of matrix compute engine 205 as appropriate. The accumulator(s) can be used to sum the results computed across multiple iterations of the vector units. For example, the result from one iteration of a vector unit can be stored in an accumulator and added to the result of the next iteration of the vector unit. In some embodiments, the accumulator is a vector accumulator. For example, the accumulator may be sized based on the size of an output vector of matrix compute engine 205. In various embodiments, once matrix processing is complete, the accumulator results may be pushed to memory via bus 251.

Figure 3:
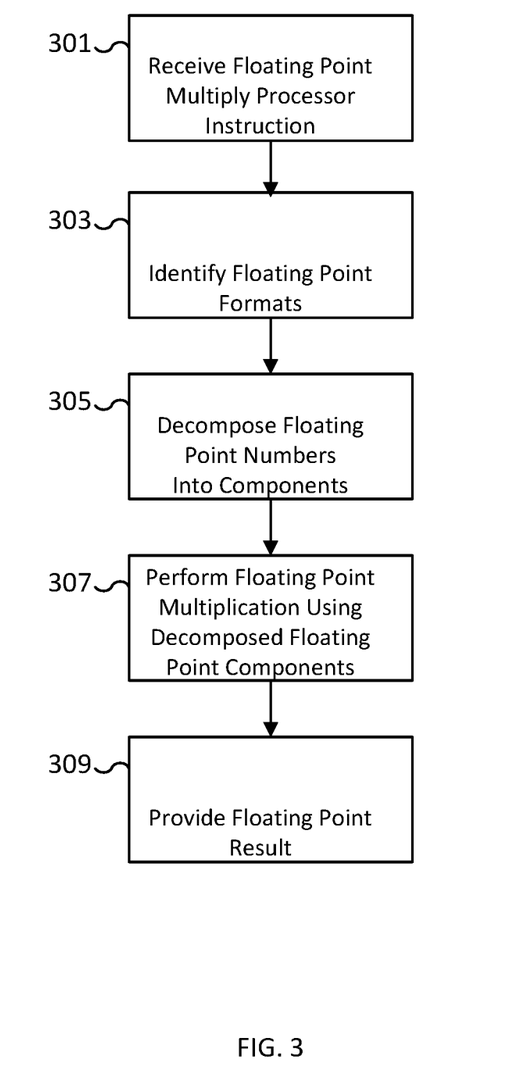
FIG. 3 is a flow chart illustrating an embodiment of a process for performing a floating point multiplication.

FIG. 3 is a flow chart illustrating an embodiment of a process for performing a floating point multiplication. In the process of FIG. 3, a floating point multiplication operation using multiplication operands that exceed the number of bits of a hardware multiplier unit may be performed. For example, each multiplication operand is decomposed into a component number supported by the hardware multiplier unit to compute partial results that are summed. Using the disclosed techniques, a processing element is capable of supporting multiple floating point formats and consequently multiple types of neural network models while maintaining a high throughput and with minimal additional hardware modifications. The supported floating point multiplication operations can be used to solve artificial intelligence problems using a neural network that utilizes a floating point format that exceeds the native hardware capabilities of a matrix compute engine and its multiplier units. For example, an FP32 floating point operation can be performed using a matrix compute engine with FP21 multipliers. In some embodiments, the process of FIG. 3 is performed in response to receiving a multiply operation instruction at a control unit of a processing element, such as processing elements 101, 111, and/or 121 of FIG. 1 and/or processing element 201 of FIG. 2.

At 301, a floating point multiply processor instruction is received. For example, an FP32 floating point multiply operation instruction specifying two FP32 numbers is received at a control logic of a processing element. The multiply operation instruction may specify two 32-bit floating point numbers. In some embodiments, the number of bits used by each operand may be 32-bits or another appropriate bit size that is larger than the number of bits supported by the hardware multipliers of the processing element. In some embodiments, the instruction is a vector instruction. For example, two vectors of operands may be received and each element of a first vector is to be multiplied with a corresponding element of a second vector.

At 303, the floating point formats are identified. For example, the floating point format for the specified multiplication operands are identified and may include FP32, FP16, BFloat16, and/or other floating point formats. In various embodiments, multiple different floating point formats are supported by the processing element. The hardware multipliers of the processing element can natively support one or more formats while other format(s) are supported via a decomposition process. For example, a matrix compute engine with vector units that support FP21 elements can natively support FP16 and BFloat16 floating point formats without decomposing the operands into component numbers. Support for FP32 is implemented by decomposing the FP32 operands into FP21 numbers. In some embodiments, the floating point format is specified by the multiply processor instruction.

At 305, the floating point numbers are decomposed into component numbers. For example, non-native floating point operands are decomposed into a group of native floating-point numbers. In some embodiments, the vector unit of a matrix compute engine supports up to 21-bit floating point numbers natively. A 32-bit floating point operand is not natively supported and is decomposed into two or more 21-bit floating point operands. The sum of the decomposed components is equal to the original floating point operand.

At 307, a floating point multiplication using the decomposed floating point component numbers is performed. For example, the decomposed components of the floating point operands are used to first determine intermediate multiplication results. The intermediate multiplication results are then summed to determine a final floating point result. In some embodiments, the intermediate multiplication results are performed by multipliers of a matrix compute engine such as vector multiply unit 213 of vector unit 211 of FIG. 2. The intermediate multiplication results can be summed using the adder units of a matrix compute engine such as vector adder unit 215 of vector unit 211 of FIG. 2. In some embodiments, only a subset of the components are needed to determine the multiplication result. For example, in some embodiments, one or more component numbers representing the least significant bits of a floating point operand do not impact the multiplication result and are not needed.

At 309, the floating point result is provided. For example, the floating point result is provided to the next step for solving an artificial intelligence problem. In some embodiments, the result is utilized to solve the next layer of a neural network and/or combined with results from other processing elements. In some embodiments, the result is written back to memory such as memory 131 of FIG. 1 where the result can be utilized by a subsequent operation. In various embodiments, the floating point result provided at 309 suffers no loss in accuracy by decomposing the floating point operands into component numbers.

Figure 4:
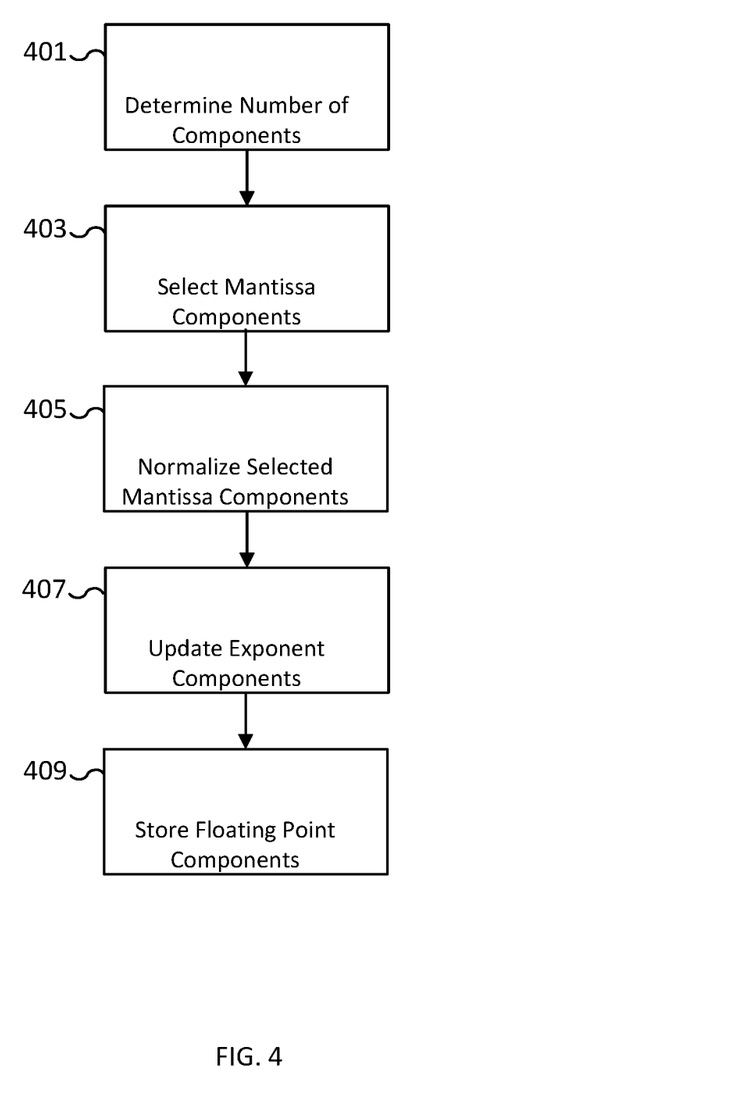
FIG. 4 is a flow chart illustrating an embodiment of a process for decomposing a floating point operand.

FIG. 4 is a flow chart illustrating an embodiment of a process for decomposing a floating point operand. In some embodiments, the process of FIG. 4 can be used to decompose a floating point number that exceeds the number of bits of a hardware multiplier unit into a component number compatible with the hardware multiplier unit. For example, a control logic of a matrix compute engine with vector units that support up to 21-bit floating point numbers decomposes a 32-bit operand into two or more 21-bit floating point numbers. Once decomposed, the 21-bit hardware multipliers are used to compute multiplication results using the 21-bit floating point numbers. In some embodiments, the process of FIG. 4 is performed at 305 of FIG. 3. In some embodiments, the process is performed using the control logic of a processor element such as control logic 113 of FIG. 1 and/or control logic 203 of FIG. 2.

At 401, the number of components is determined. For example, the number of components a floating point operand is decomposed into is determined. In some embodiments, the number is based on the operands (or operand formats) supported by the available multiplier units. For example, an FP21 multiplier may support up to a 21-bit floating point component using a single sign bit, a 9-bit exponent, and an 11-bit mantissa. The 11-bits of the mantissa can represent the 11 most significant bits or any 12 consecutive least significant bits (the size of the supported hardware mantissa plus an additional bit represented as an implicit J-bit) of the original floating point operand. In various embodiments, the number of components is determined based on how many component mantissas are required to represent the mantissa of the original floating point operand and the number of exponent bits supported by the multipliers matches the number of exponent bits of the floating point operand. For example, two FP21 components, each with an 11-bit mantissa, are used to represent a FP32 floating point operand with a 23-bit mantissa. As another example, three FP19 components, each with a 10-bit mantissa, are used to represent an FP32 floating point operand with a 23-bit mantissa. In both examples, the floating point operand utilizes 8-bits for exponents and the supported hardware utilizes an additional bit, that is 9-bits, for exponents. The additional bit used by component numbers for exponents ensures accuracy, for example, by preventing underflow. As an example, underflow can be avoided when adding small exponent values. In some embodiments, a lossy implementation may not utilize all of the least significant bits of the original floating point operand.

At 403, mantissa components are selected. For example, the mantissa of the floating point operand is split across multiple component numbers based on the number of components determined at 401. In some embodiments, the mantissa components are selected by masking the mantissa of the original floating point operand. For example, the first 11 bits and the next 12 bits are separately masked to create an 11-bit mantissa and a 12-bit mantissa from the original 23-bit mantissa of the floating point operand. In the example, the 23-bit mantissa is decomposed into two components. In some embodiments, more components may be used. For example, a 23-bit mantissa can be split across three components using, for example, the first 10-bits, the next 11-bits, and the final 2-bits. In various embodiments, only the most significant bits selected from the original mantissa require the same number of bits for storage. Mantissa components selected from the least significant bits require one or more fewer bits because of an implicit J-bit. For example, the 12 least significant bits of the original mantissa require at most 11-bits once normalized since the 1-bit binary integer is implicit and only the binary fraction is saved.

At 405, selected mantissa components are normalized. In some embodiments, the mantissa components are normalized and only the binary fraction portion of the normalized mantissa is stored. A corresponding normalization exponent offset to account for normalization is determined and used at 407 to update a corresponding exponent component. For example, the selected mantissa corresponding to the least significant digits of the float point operand's mantissa is normalized. In the event the selected mantissa begins with zeros, the leading zeros are stripped until a leading one is encountered. The leading one, corresponding to a 1-bit binary integer portion of the selected mantissa, is stripped and represented by an implicit J-bit. The remaining bits of the selected mantissa are stored and correspond to the binary fraction portion. As another example, the selected mantissa begins with three leading zeros. Once normalized, the selected mantissa is stripped of the first four bits (three zeros and a one). The corresponding normalization exponent offset of the normalized mantissa is 4. In various embodiments, another appropriate normalization process retaining the accuracy of the selected mantissa may be utilized. In some embodiments, the mantissa component corresponding to the most significant digits of the float point operand's mantissa does not need normalizing since it is already in normalized form.

At 407, exponent components are updated. In various embodiments, the exponent components are updated to reflect the mantissa selection performed at 403 and any normalization performed at 405. For example, a 32-bit floating point number is decomposed into two 21-bit floating point components using the first 11 (and most significant) bits and the next 12 bits from the original 23-bit mantissa of the floating point operand. The exponent component for the first 11 bits is copied from the original floating point operand's exponent without modification. The exponent component for the next 12 bits is based on the original floating point operand's exponent and offset by the selection mask used at 403 (e.g., 11 places) and the normalization exponent offset determined at 405. In various embodiments, once the exponent components are updated, the sum of the component floating point numbers equals the original floating point operand.

At 409, the floating point component numbers are stored. For example, the numbers may be stored in a register, a scratch memory location, or another appropriate memory. In some embodiments, the numbers are stored into an input buffer for a matrix compute engine in preparation for loading the component numbers into the matrix compute engine for performing a matrix operation.

Figure 5:
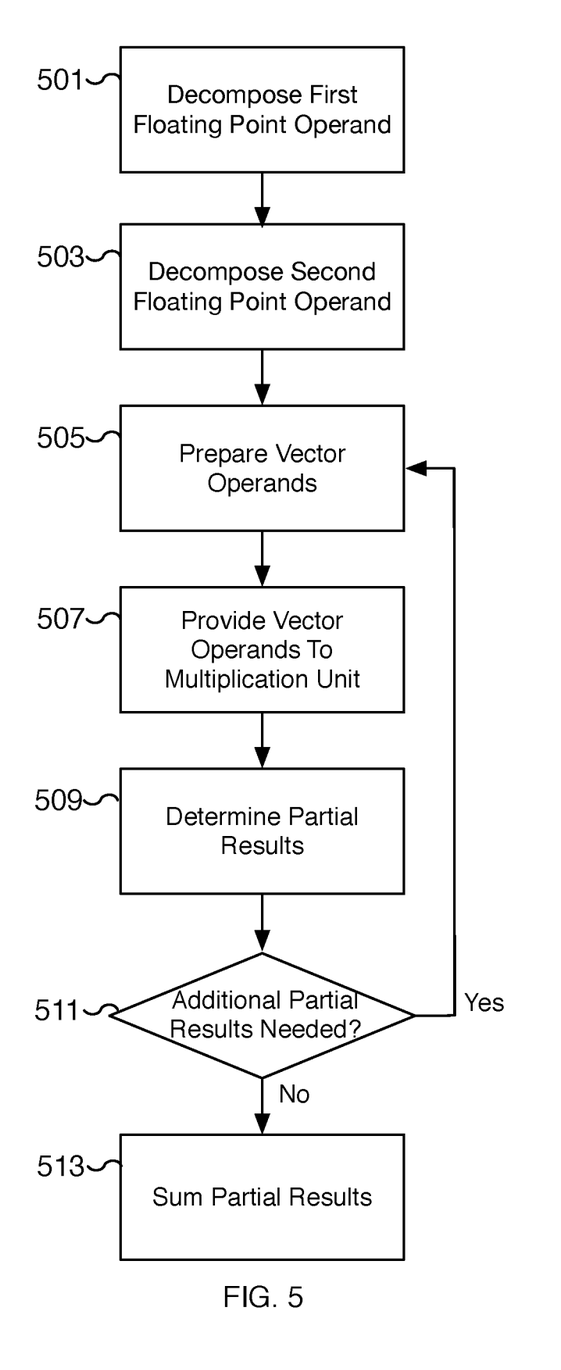
FIG. 5 is a flow chart illustrating an embodiment of a process for performing a floating point multiplication using component numbers.

FIG. 5 is a flow chart illustrating an embodiment of a process for performing a floating point multiplication using component numbers. In some embodiments, the process of FIG. 5 is performed in response to receiving a multiply operation instruction. For example, a processing element such as processing element 111 of FIG. 1 receives a multiply operation specifying operands using a floating point format that exceeds the number of bits supported by the hardware capabilities of the processing element's matrix compute engine. The floating point operands are decomposed into component numbers used to determine the multiplication result. Unlike the floating point operands, the format of the component numbers is natively supported by the matrix compute engine. In some embodiments, the process of FIG. 5 is performed using a control logic such as control logic 113 of FIG. 1 and/or control logic 203 of FIG. 2 and using a matrix compute engine such as matrix compute engine 115 of FIG. 1 or matrix compute engine 205 of FIG. 2. In various embodiments, the process of FIG. 5 is performed at 305 and/or 307 of FIG. 3.

At 501, a first floating point operand is decomposed into a first group of component numbers. For example, a 32-bit floating point number is decomposed into two or more component numbers that are supported by a multiplication unit. In some embodiments, a multiplication unit supports FP21 numbers and an FP32 number is decomposed into two FP21 numbers. In various embodiments, the decomposition into component numbers is performed using the process of FIG. 4.

At 503, a second floating point operand is decomposed into a second group of component numbers. For example, a 32-bit floating point number is decomposed into two or more component numbers that are supported by a multiplication unit. In some embodiments, a multiplication unit supports FP21 numbers and an FP32 number is decomposed into two FP21 numbers. In various embodiments, the decomposition into component numbers is performed using the process of FIG. 4.

At 505, vector operands are prepared. Using the component numbers created from the decomposition steps of 501 and 503, vector operands are prepared for one or more vector units. The vector operands are prepared to ensure that each component number of the first floating point operand is multiplied with each component number of the second floating point operand. For example, in some embodiments, the first floating point operand is decomposed into two component numbers (e.g., A1 and A2) and the second floating point operand is similarly decomposed into two component numbers (e.g., B1 and B2). The floating point operands are prepared such that four multiplication results corresponding to A1×B1, A1×B2, A2×B1, and A2×B2 are determined. The multiplication results are partial results or intermediate multiplication results that are summed to determine the final multiplication result. In some embodiments, each multiplication pair is prepared in corresponding vector operands. By decomposing each floating point operand into two component numbers, four intermediate multiplication results corresponding to four element pair multiplication operations are needed. By using vector multiplication operations, fewer vector multiplication operations than element pair multiplications are needed. For example, a single vector multiplication operation can be performed to determine all four intermediate multiplication results by preparing the first vector operand with elements [A1 A1 A2 A2] and the second vector operand with elements [B1 B2 B1 B2].

In various embodiments, alternative vector preparation techniques for determining partial results are appropriate as well. For example, the vector operands can be prepared as two pairs of vector operands. A first pair of vector operands can be prepared with the first vector operand having elements [A1 A2] and the second vector operand having elements [B1 B1]. A second pair of vector operands can be prepared with the first vector operand having elements [A1 A2] and the second vector operand having elements [B2 B2]. The two different pairs of vector operands can be prepared during the same iteration through step 505 or during separate iterations through step 505. By preparing multiple pairs of vector operands during the same iteration, multiple corresponding vector operations can be performed in parallel at step 509 using different vector units of a matrix compute engine.

In various embodiments, the number of intermediate multiplication results needed is based on the number of component numbers. For example, floating point operands decomposed into three component numbers (e.g., A1, A2, and A3 and B1, B2, and B3) may require up to nine intermediate multiplication results. Three pairs of vector operands can be prepared corresponding to the vector operations using vector operands [A1, A2, A3] and [B1, B1, B1]; [A1, A2, A3] and [B2, B2, B2]; and [A1, A2, A3] and [B3, B3, B3]. Using the three vector operands, all nine intermediate multiplication results can be determined.

In some embodiments, certain pairs of component numbers from the two floating point operands are not prepared. For example, in the event the intermediate multiplication result determined by multiplying a pair of component numbers has no impact on the final multiplication result, the intermediate multiplication result is not needed and the corresponding component numbers for the multiplication operation are not prepared. For example, in certain scenarios, the multiplication results of component numbers that correspond to the least significant bits of each floating point operand are too small to impact the final multiplication result. In various embodiments, insignificant pairs of component numbers are not included when preparing the vector operands. For example, floating point operands decomposed into three component numbers may only require six of the total nine possible intermediate multiplication results.

At 507, vector operands are provided to a multiplication unit. For example, the vector operands prepared at 505 are provided to a matrix compute engine such as matrix compute engine 115 of FIG. 1 and/or matrix compute engine 205 of FIG. 2. In some embodiments, a vector multiply unit such as vector multiply unit 213 of FIG. 2 receives a pair of vector operands. In some embodiments, multiple vector multiplication units each receive vector operands prepared at 505. For example, each multiplication vector unit can operate on a pair of vector operands in parallel.

At 509, partial results are determined. For example, a vector multiply operation is performed using the vector operands prepared at 505 and provided to one or more multiplication units at 507. In some embodiments, the vector multiply operation is performed by a vector unit such as one of vector units 211, 221, 231, or 241 of FIG. 2. The vector multiplying may be performed by a vector multiply unit such as vector multiply unit 213 of FIG. 2. The multiplication results of a vector multiply operation are partial results or intermediate multiplication results.

At 511, a determination is made whether additional partial results are needed. For example, additional intermediate multiplication results may be needed to determine the final multiplication result. In the event additional partial results are needed, processing loops back to step 505. In the event no additional partial results are needed, processing proceeds to step 513.

At 513, the partial results are summed. In some embodiments, the intermediate multiplication results are partial results and are summed to determine a final multiplication result. The summing operations may be performed using a vector adder unit such as vector adder unit 215 of FIG. 2. In various embodiments, the adder unit is sized to avoid underflowing the exponent when summing partial results. For example, the adder unit may support an additional bit of precision not necessary when the adder unit is utilized for results using only native number formats.

In some embodiments, the partial results may also be summed after and/or as part of determining a new partial result at 509. For example, instead of only performing the summation at 513 after all partial results are determined, summing operations can also be performed as part of step 509. At 509, an intermediate partial sum can be determined by each vector unit and at 513, the intermediate partial sums are added together to determine a final sum corresponding to the multiplication result.

Figure 6:
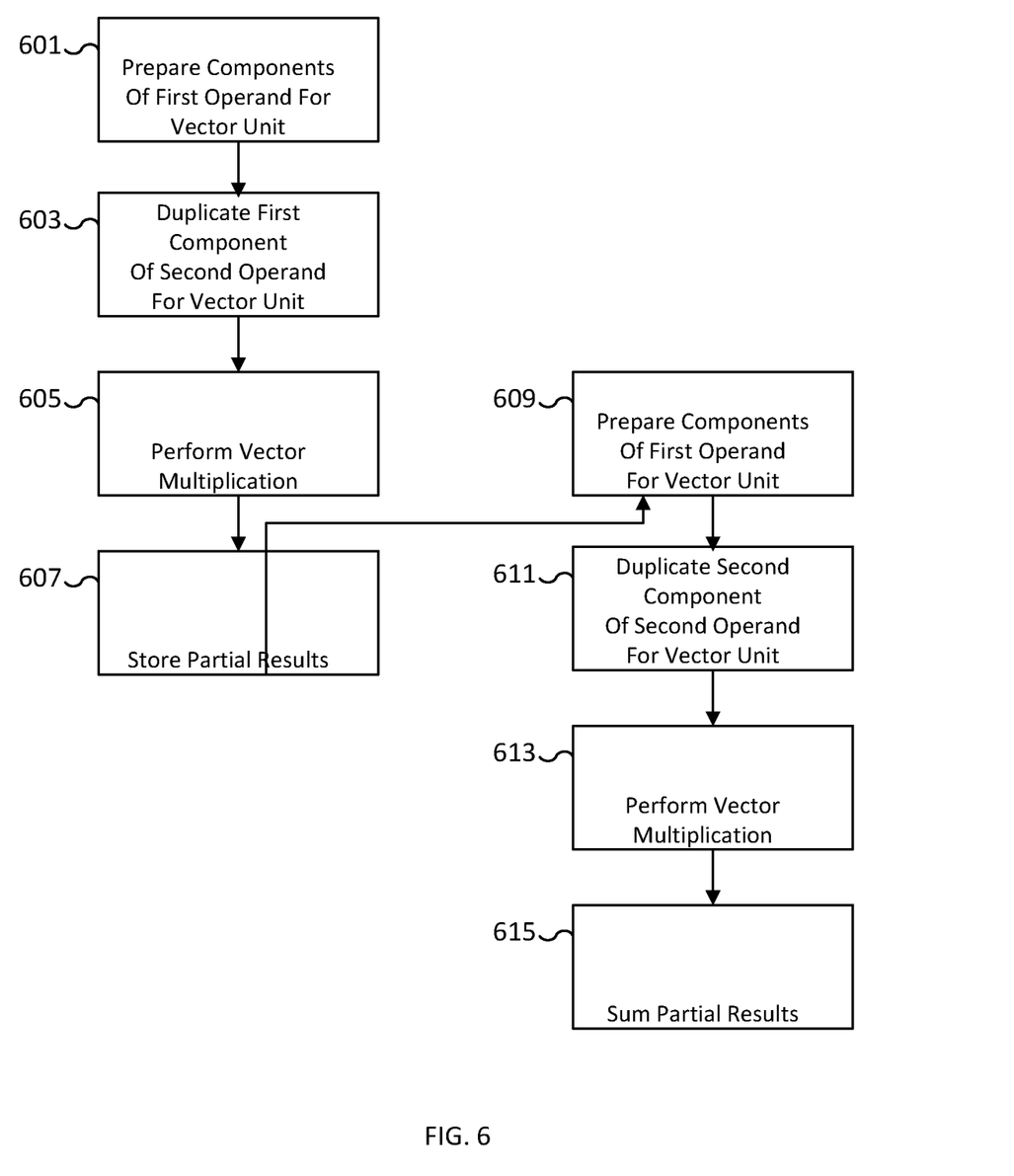
FIG. 6 is a flow chart illustrating an embodiment of a process for performing a floating point multiplication using component numbers.

FIG. 6 is a flow chart illustrating an embodiment of a process for performing a floating point multiplication using component numbers. In some embodiments, the process of FIG. 6 is performed in response to receiving a multiply operation instruction. For example, a processing element such as processing element 111 of FIG. 1 receives a multiply operation specifying operands using a floating point format that exceeds the number of bits supported by the hardware capabilities of the processing element's matrix compute engine. In the example of FIG. 6, the floating point operands are each decomposed into two component numbers used to determine the multiplication result. A first floating point operand is decomposed into component numbers A1 and A2. And a second floating point operand is decomposed into component numbers B1 and B2. Unlike the floating point operands, the format of the component numbers (A1, A2, B1, and B2) is natively supported by the matrix compute engine. In some embodiments, the process of FIG. 6 is performed using a control logic such as control logic 113 of FIG. 1 and/or control logic 203 of FIG. 2 and using a matrix compute engine such as matrix compute engine 115 of FIG. 1 or matrix compute engine 205 of FIG. 2. In various embodiments, the process of FIG. 6 is performed at 307 of FIG. 3 and/or at 505, 507, 509, 511, and/or 513 of FIG. 5.

At 601, the components of the first floating point operand are prepared for the vector unit. In some embodiments, a vector operand is prepared by loading each component number of the first floating point operand as an element of the vector operand. For example, a vector operand (e.g., [A1 A2]) is prepared with both component numbers A1 and A2.

At 603, the first component of the second floating point operand is duplicated for the vector unit. In some embodiments, a vector operand is prepared by duplicating a single component number (i.e., the first component number) of the second floating point operand into two elements of the vector operand. For example, a vector operand (e.g., [B1 B1]) is prepared with both elements using component number B1. The elements loaded at 603 correspond to the elements prepared at 601.

At 605, vector multiplication is performed using a matrix compute engine. For example, the vector operands prepared at 601 and 603 are used by a vector unit of a matrix compute engine to perform a vector multiplication operation. The result is two intermediate multiplication results corresponding to multiplying A1×B1 and A2×B1. In some embodiments, the result is a two element vector holding two intermediate multiplication (or partial) results. The vector result can be determined using a vector multiply unit such as vector multiply unit 213 of FIG. 2. In some embodiments, the two intermediate multiplication results are summed using a vector adder unit such as vector adder unit 215 of FIG. 2 to determine a partial sum corresponding to (A1×B1)+(A2×B1).

At 607, the partial results determined at 605 are stored. In some embodiments, two intermediate multiplication results are stored. The results may be stored in an accumulator of the matrix compute engine or another appropriate memory location. In some embodiments, a single intermediate result corresponding to a partial sum (A1×B1)+(A2×B1) is stored.

At 609, the components of the first floating point operand are prepared for the vector unit. In some embodiments, a vector operand is prepared by loading each component number of the first floating point operand as an element of the vector operand similar to the step of 601. For example, a vector operand (e.g., [A1 A2]) is prepared with both component numbers A1 and A2. In some embodiments, since the vector operand at 609 is identical to the vector operand prepared at 601, the vector operand prepared at 601 is used with minimal additional processing.

At 611, the second component of the second floating point operand is duplicated for the vector unit. In some embodiments, a vector operand is prepared by duplicating a single component number (i.e., the second component number) of the second floating point operand into two elements of the vector operand. For example, a vector operand (e.g., [B2 B2]) is prepared with both elements using component number B2. The elements loaded at 611 correspond to the elements prepared at 609.

At 613, vector multiplication is performed using a matrix compute engine. For example, the vector operands prepared at 609 and 611 are used by a vector unit of a matrix compute engine to perform a vector multiplication operation. The result is two intermediate multiplication results corresponding to multiplying A1×B2 and A2×B2. In some embodiments, the result is a two element vector holding two intermediate multiplication (or partial) results. The vector result can be determined using a vector multiply unit such as vector multiply unit 213 of FIG. 2. In some embodiments, the two intermediate multiplication results are summed using a vector adder unit such as vector adder unit 215 of FIG. 2 to determine a partial sum corresponding to (A1×B2)+(A2×B2). In some embodiments, the vector multiplication steps 605 and 613 are performed during two different passes and each vector multiplication can use the same vector unit.

At 615, the partial results are summed. For example, the partial results determined at 605 and stored at 607 are summed with the partial results determined at 613. The resulting sum is the final multiplication result. In some embodiments, a vector adder unit such as vector adder unit 215 of FIG. 2 is used to perform the final summation. In the example of FIG. 6, the final multiplication result corresponds to the operations (A1×B1)+(A2×B1)+(A1×B2)+(A2×B2).

In some embodiments, the steps 601, 603, 609, and 611 associated with preparing vector operands from the first and second floating point operands are performed in parallel. Similarly, the multiplication steps 605 and 613 are performed in parallel. Once prepared, each pair of operands can be directed to a different vector unit of a matrix compute engine for performing vector multiplications in parallel. In some embodiments, the vector operand prepared at 609 is identical to the vector operand required at 601. Instead of duplicating the processes of 601, the vector operand prepared from 601 may be duplicated for the step of 609. In some embodiments, a selected vector operand can be broadcasted to multiple vector units in the event multiple vector units share the same operand. For example, in some embodiments, the matrix compute engine supports a broadcast functionality to broadcast the same vector operand prepared at 601 and 609 to multiple vector units.

Figure 7:
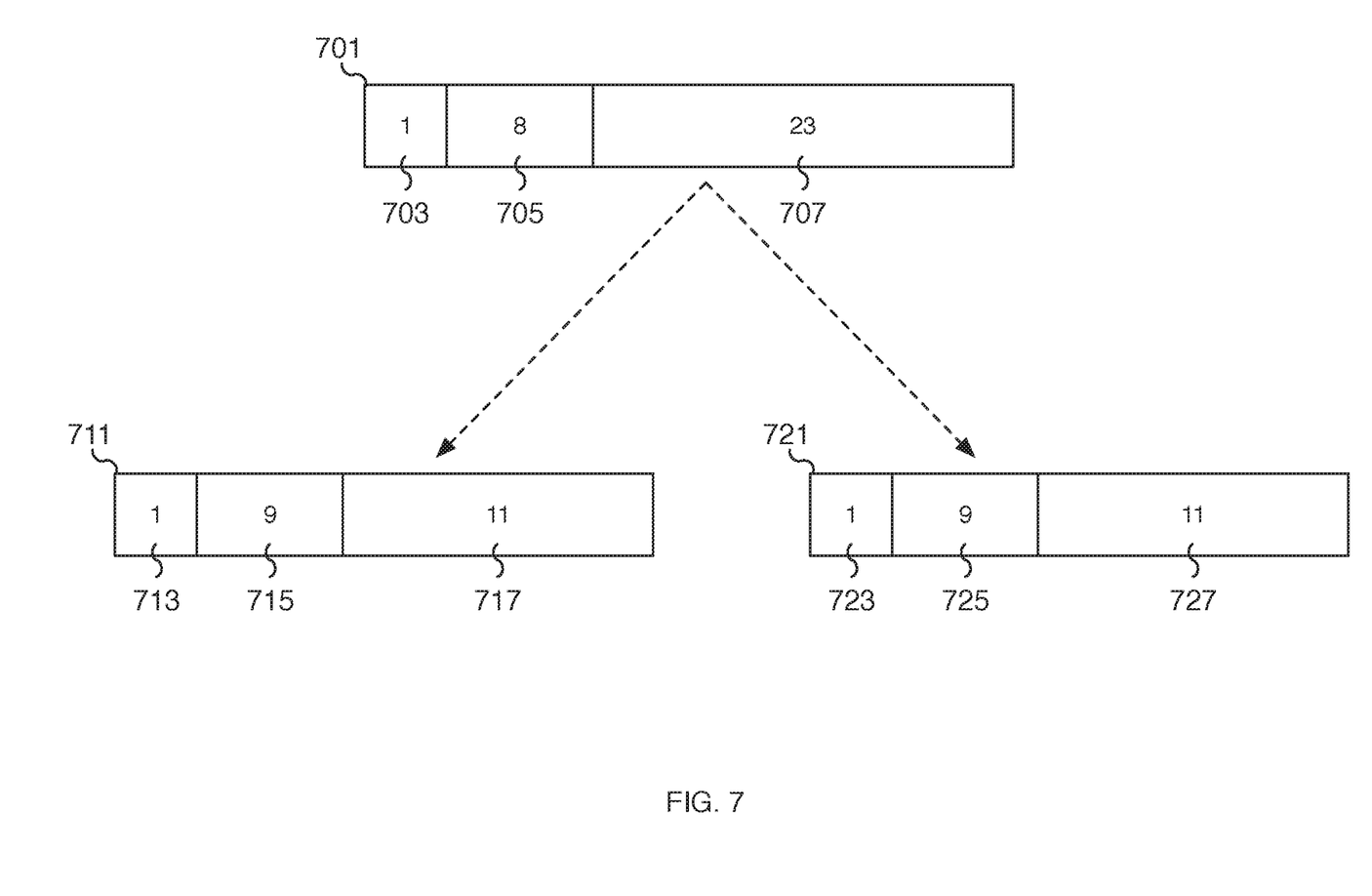
FIG. 7 is a diagram illustrating an example floating point number decomposed into a group of component numbers.

FIG. 7 is a diagram illustrating an example floating point number decomposed into a group of component numbers. In the example shown, a first floating point represented by floating point layout 701 is decomposed into two component floating point numbers represented by floating point layouts 711 and 721. Floating point layout 701 is a 32-bit floating point number and includes single sign bit 703, 8-bit exponent 705, and 23-bit mantissa 707. Floating point layouts 711 and 721 both utilize the same format and each includes single sign bits 713 and 723, 9-bit exponents 715 and 725, and 11-bit mantissas 717 and 727, respectively. In various embodiments, a processing element such as processing element 111 of FIG. 1 receives a multiply operation instruction specifying operands using the format of floating point layout 701. The processing element decomposes each operand into smaller component numbers that utilize the format of floating point layouts 711 and 721 and are supported by the matrix compute engine of the processing element. For example, a 32-bit floating point number can be decomposed into two smaller 21-bit floating point numbers that the vector units of the matrix compute engine support. By decomposing the larger floating point format into smaller components, operations such as multiplication for larger floating point formats can be supported. In some embodiments, the components are decomposed using the processes of FIG. 3-6. In various embodiments, the example of FIG. 7 utilizes 32-bits for floating point layout 701 and 21-bits for floating point layouts 711 and 721 but other appropriate bit-sizes may be utilized as well where the number of bits used by the original floating point number is greater than the number of bits used by each of the component numbers. In various embodiments, the format for the component numbers utilizes an extra bit for the exponent than the original floating point number operands. For example, an original floating point number that allocates 8-bits to an exponent is decomposed using component numbers that allocate 9-bits to represent an exponent. The extra bit allows accuracy to be preserved when processing the component numbers to determine a multiply result.

In some embodiments, a first portion of mantissa 707 is represented by mantissa 717 and a second portion of mantissa 707 is represented by mantissa 727. For example, the first 11 most significant bits of mantissa 707 may be represented by mantissa 717 and the 12 least significant bits of mantissa 707 (by normalizing and using an implicit J-bit) may be represented by mantissa 727. Corresponding exponents 715 and 725 are based on exponent 705. For example, exponent 715 is the same as exponent 705 and exponent 725 is updated based on the exponent offset required for mantissa 727 after selecting mantissa 727 from mantissa 707 and normalizing.

In some embodiments, the component floating point number represented by floating point layout 711 corresponds to the most significant digits and the component floating point number represented by floating point layout 721 corresponds to the least significant digits of the floating point number of floating point layout 701. In some embodiments, the floating point number of floating point layout 701 is decomposed into two component numbers, such as A1 and A2 or B1 and B2. A1 or B1 corresponds to floating point layout 711 and A2 or B2 corresponds to floating point layout 721.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A processor system, comprising:
one or more logic units configured to:
receive a processor instruction identifying a first original floating point number to be multiplied with a second original floating point number;
decompose the first original floating point number including a first mantissa component and a first exponent component into a first group of a plurality of decomposed floating point numbers, wherein a number of bits used to represent the first original floating point number is greater than a number of bits used to represent any decomposed floating point number in the first group of the plurality of decomposed floating point numbers and a number of bits used to represent any exponent component of any decomposed floating point number in the first group of the plurality of decomposed floating point numbers is larger than a number of bits used to represent the first exponent component of the first original floating point number; and
decompose the second original floating point number including a second mantissa component and a second exponent component into a second group of a plurality of decomposed floating point numbers, wherein a number of bits used to represent the second original floating point number is greater than a number of bits used to represent any decomposed floating point number in the second group of the plurality of decomposed floating point numbers and a number of bits used to represent any exponent component of any decomposed floating point number in the second group of the plurality of decomposed floating point numbers is greater than a number of bits used to represent the second exponent component of the second original floating point number; and
one or more multiplication units configured to:
multiply the decomposed floating point numbers of the first group with the decomposed floating point numbers of the second group to determine intermediate multiplication results that are summed together to determine an effective result that represents a result of multiplying the first original floating point number with the second original floating point number.

2. The system of claim 1, wherein the one or more logic units are configured to identify that the first original floating point number is in a first format, wherein a number of bits used to represent the first format exceeds a number of bits supported by hardware capabilities of each individual one of the one or more multiplication units.

3. The system of claim 1, wherein each of the one or more multiplication units is a 21-bit floating point unit.

4. The system of claim 3, wherein the 21-bit floating point unit utilizes 1 bit for a sign bit, 9 bits for the exponent component, and 11 bits for the mantissa component.

5. The system of claim 1, wherein each of the one or more multiplication units is able to perform an FP16 and a BFloat16 floating point multiplication operation.

6. The system of claim 1, wherein the first original floating point number is a 32-bit floating-point number and wherein hardware capabilities of the one or more multiplication units do not support performing a 32-bit floating-point multiplication operation using only a single multiplication operation.

7. The system of claim 1, further comprising a matrix compute engine that includes a plurality of vector units.

8. The system of claim 7, wherein each of the plurality of vector units includes a vector multiply unit and a vector adder unit.

9. The system of claim 8, wherein the vector multiply unit includes the one or more multiplication units.

10. The system of claim 8, wherein the vector adder unit is an adder tree.

11. The system of claim 1, wherein a sum of each decomposed floating point number of the first group of the plurality of decomposed floating point numbers is equal to the first original floating point number.

12. The system of claim 1, wherein the mantissa component of at least one decomposed floating point number of the first group of the plurality of component numbers is normalized to remove leading zeros and a 1-bit binary integer.

13. The system of claim 1, wherein the first group of the plurality of decomposed floating point numbers includes a first decomposed floating point number and a second decomposed floating point number, and wherein a sum of the first decomposed floating point number and the second decomposed floating point number is equal to the first original floating point number.

14. The system of claim 13, wherein the first decomposed floating point number is associated with 11-bits of the mantissa component of the first original floating point number and the second decomposed floating point number is associated with a remaining 12-bits of the mantissa component of the first original floating point number.

15. The system of claim 13, wherein the first decomposed floating point number represents a most significant bit sequence of the first original floating point number and the second decomposed floating point number represents a least significant bit sequence of the first original floating point number, and wherein the most significant bit sequence is associated with a fewer number of bits of the mantissa component of the first original floating point number than the least significant bit sequence.

16. The system of claim 1, wherein the one or more logic units are further configured to:
prepare a first vector operand using one or more decomposed floating point numbers of the first group of the plurality of decomposed floating point numbers; and
prepare a second vector operand using one or more decomposed floating point numbers of the second group of the plurality of decomposed floating point numbers.

17. The system of claim 1, wherein the result of multiplying the first original floating point number with the second original floating point number is used at least in part to apply a neural network model to an artificial intelligence problem.

18. A method comprising:
receiving a processor instruction;
identifying a first original floating point number to be multiplied with a second original floating point number;

decomposing the first original floating point number including a first mantissa component and a first exponent component into a first group of a plurality of decomposed floating point numbers, wherein a number of bits used to represent the first original floating point number is greater than a number of bits used to represent any decomposed floating point number in the first group of the plurality of decomposed floating point numbers and a number of bits used to represent any exponent component of any decomposed floating point number in the first group of the plurality of decomposed floating point numbers is larger than a number of bits used to represent the first exponent component of the first original floating point number;

decomposing the second original floating point number including a second mantissa component and a second exponent component into a second group of a plurality of decomposed floating point numbers, wherein a number of bits used to represent the second original floating point number is greater than a number of bits used to represent any decomposed floating point number in the second group of the plurality of decomposed floating point numbers and a number of bits used to represent the second exponent component of the second original floating point number is less than a number of bits used to represent any exponent component of any decomposed floating point number in the second group of the plurality of decomposed floating point numbers;

multiplying the decomposed floating point numbers of the first group with the decomposed floating point numbers of the second group to determine intermediate multiplication results; and summing together the intermediate multiplication results to determine an effective result that represents a result of multiplying the first original floating point number with the second original floating point number.

19. A method comprising:

receiving a processor instruction;

identifying a first original floating point number to be multiplied with a second original floating point number;

decomposing the first original floating point number including a first mantissa component and a first exponent component into a first group of a plurality of decomposed floating point numbers, wherein a number of bits used to represent the first original floating point number is greater than a number of bits used to represent any decomposed floating point number in the first group of the plurality of decomposed floating point numbers and a number of bits used to represent any exponent component of any decomposed floating point number in the first group of the plurality of decomposed floating point numbers is larger than a number of bits used to represent the first exponent component of the first original floating point number;

decomposing the second original floating point number including a second mantissa component and a second exponent component into a second group of a plurality of decomposed floating point numbers, wherein a number of bits used to represent the second original floating point number is greater than a number of bits used to represent any decomposed floating point number in the second group of the plurality of decomposed floating point numbers and a number of bits used to represent the second exponent component of the second original floating point number is less than a number of bits used to represent any exponent component of any decomposed floating point number in the second group of the plurality of decomposed floating point numbers;

preparing a first vector operand using every decomposed floating point number of the first group of the plurality of decomposed floating point numbers;

preparing a second vector operand by duplicating a first decomposed floating point number of the second group of the plurality of decomposed floating point numbers; and multiplying the first vector operand with the second vector operand to determine a first intermediate multiplication results.

20. The method of claim 19, further comprising:

preparing a third vector operand using every decomposed floating point number of the first group of the plurality of decomposed floating point numbers;

preparing a fourth vector operand by duplicating a second decomposed floating point number of the second group of the plurality of decomposed floating point numbers, wherein the second decomposed floating point number is different from the first decomposed floating point number;

multiplying the third vector operand with the fourth vector operand to determine a second intermediate multiplication results; and summing together the first and second intermediate multiplication results to determine an effective result that represents a result of multiplying the first original floating point number with the second original floating point number.

* * * * *